Sept. 12, 1967   R. H. KRESS   3,341,220
SUSPENSION FOR LARGE CAPACITY TRUCKS
Filed Sept. 21, 1965
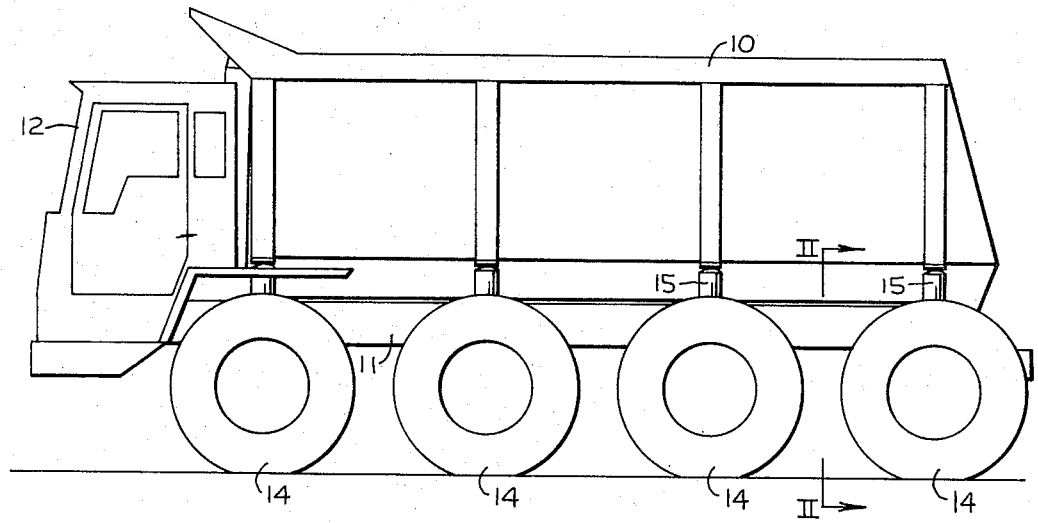
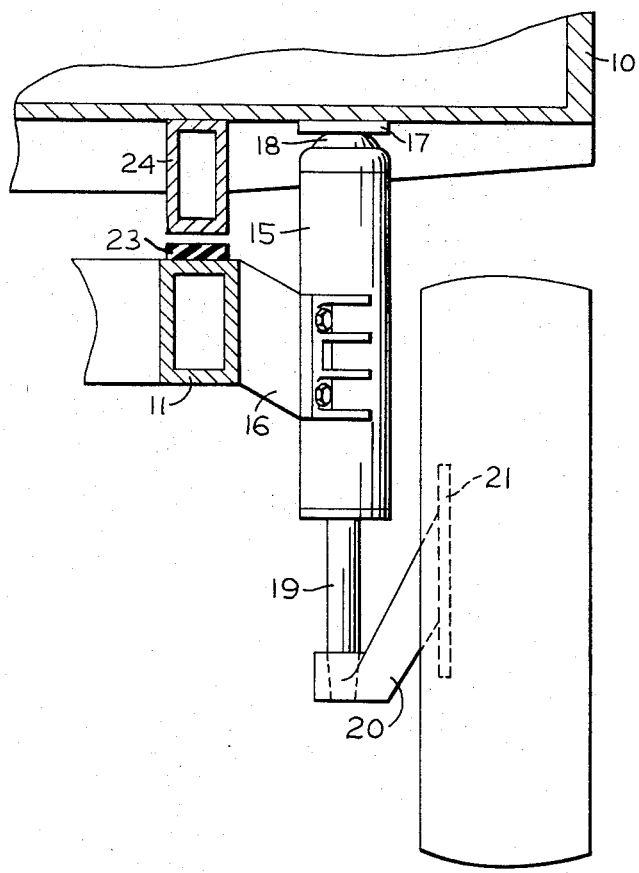
INVENTOR.
RALPH H. KRESS
BY
ATTORNEYS 3,341,220
SUSPENSION FOR LARGE CAPACITY TRUCKS
Ralph H. Kress, Peoria, Ill., assignor to Caterpillar Tractor Co., Peoria, Ill., a corporation of Illinois
Filed Sept. 21, 1965, Ser. No. 488,986
1 Claim. (Cl. 280—106.5)

ABSTRACT OF THE DISCLOSURE

Suspension means for trucks having a load carrying body, a frame and wheels and comprising a resilient strut extending between each wheel and the load carrying body and supported and positioned by the frame in such a manner that very little stress is imparted to the frame.

---

Present day trends in haulage vehicles is toward trucks having greater capacity, particularly in equipment for use exclusively in off-highway work where size and weight are not limited by highway capacities and safety considerations.

The pay load of any vehicle is reduced by the weight of its own structure and where capacities reach upwards of twenty-five tons the vehicle components are necessarily heavy and reduction in their size will add materially to the pay load as well as reducing the cost of the components themselves.

Furthermore, resilient suspension devices such as air cushions or pneumatic cylinders must sustain the load and require very heavy supporting brackets and a very heavy vehicle frame between load carrying vehicle body and the ground engaging wheels.

It is an object of the present invention to provide an improved suspension system for large capacity vehicles which enables a reduction in the size and weight of the vehicle frame and other related components, and which provides means for transferring the greatest part of load weight through suspension struts directly to the ground through the wheels. Further and more specific objects of the invention and the manner of carrying it into practice are made apparent in the following specification wherein reference is made to the accompanying drawing.

In the drawing:

FIG. 1 is a view in side elevation of a large truck, including the suspension system of the present invention; and FIG. 2 is an enlarged fragmentary section shown on the line II—II of FIG. 1.

The truck as shown in FIG. 1 has a body 10, a frame 11 which supports an operator's station or cab 12 and has wheels 14, each associated with the body through suspension struts shown at 15 and one of which is shown in somewhat greater detail in FIG. 2. The conventional truck of this type has a body resting on a frame and the frame is supported on wheels through some spring or resilient suspension means, which in this case are the struts 15 in the form of pneumatic cylinders. In such case the entire weight of the body and its load is imposed on the frame of the truck and is also transferred through brackets such as shown at 16 in FIG. 2, to the struts 15 and thence to the wheels 14. In the present case, this is not true because the weight of the loaded body 10 is imposed directly on the struts 15 through a reinforcing pad 17 welded to the bottom of the body for each of the struts, and preferably through a hard rubber cushion 18 fixed to the upper end of the strut.

The strut has a conventional piston rod 19 protruding from its lower end, and this rod is connected as by a bracket 20 to a conventional wheel mounting indicated at 21. The body is connected to the frame by some conventional unloading mechanism, not herein shown, for example the body may be either of the rear-dump or side-dump type, and the necessary pivotal connections, hydraulic jacks, latches and the like, which are included in any such mechanism prevent movement of the body longitudinally or laterally of the frame. Consequently the only material weight transmitted from the loaded body through the frame is during a dumping operation and the very heavy loads imposed by fast travel over rough terrain are not transmitted through the frame which may therefore be made much lighter and less costly.

It may be desirable in some cases to place a soft pad 23 in the space between body reinforcing beams 24 and the longitudinal frame members shown at 11. However, this would only be to soften the occasional impact which might be caused by twisting of the body or frame under unusually heavy working conditions. Ordinarily the entire weight of the loaded body is transmitted directly through the pneumatic strut to the wheel and the frame serves more or less to position or stabilize the struts through the bracket 16 and to carry the weight of the operator's cab.

I claim:

A suspension system for a truck which has a load carrying body, a frame and wheels comprising a resilient suspension strut for each wheel, means on the frame supporting each strut in a generally vertical position adjacent a wheel, means connecting the lower end of the strut with the wheel, and the upper end of the strut being in engagement with the body in load supporting relationship therewith whereby the greater part of the weight of the body and its load are transmitted to the ground through the struts and wheels, said body having two longitudinally extending bracing members beneath its bottom disposed above and spaced from two longitudinally extending frame members, and resilient pads between the longitudinal body and frame members.

References Cited

UNITED STATES PATENTS

| | | | |
|---|---|---|---|
| 1,902,714 | 3/1933 | Martin | 280—106.5 |
| 2,123,087 | 7/1938 | Leighton | 280—124.1 X |
| 3,024,039 | 3/1962 | Ziegler | 280—106.5 |

LEO FRIAGLIA, *Primary Examiner.*

PHILIP GOODMAN, BENJAMIN HERSH,
*Examiners.*